(12) United States Patent
Weiler et al.

(10) Patent No.: US 7,748,076 B2
(45) Date of Patent: Jul. 6, 2010

(54) WIPER DEVICE

(75) Inventors: Michael Weiler, Chungchongbuk-Do (KR); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 1285 days.

(21) Appl. No.: 10/547,203

(22) PCT Filed: Jan. 27, 2004

(86) PCT No.: PCT/DE2004/000116

§ 371 (c)(1),
(2), (4) Date: Aug. 26, 2005

(87) PCT Pub. No.: WO2004/076249

PCT Pub. Date: Sep. 10, 2004

(65) Prior Publication Data

US 2006/0143849 A1 Jul. 6, 2006

(30) Foreign Application Priority Data

Feb. 28, 2003 (DE) ................. 103 08 785

(51) Int. Cl.
*B60S 1/34* (2006.01)

(52) U.S. Cl. .................. 15/250.201; 15/250.351; 15/250.352

(58) Field of Classification Search ......... 15/250.201, 15/250.351, 250.352, 250.48, 250.44, 250.43, 15/250.361
See application file for complete search history.

(56) References Cited

U.S. PATENT DOCUMENTS

| | | | | |
|---|---|---|---|---|
| 2,799,887 A | * | 7/1957 | Nemic ............ | 15/250.201 |
| 3,317,945 A | * | 5/1967 | Ludwig .......... | 15/250.48 |
| 3,480,986 A | * | 12/1969 | Forster .......... | 15/250.32 |
| 4,581,786 A | | 4/1986 | Brümmer et al. | |
| 4,782,547 A | * | 11/1988 | Mohnach ........ | 15/250.04 |
| 5,218,735 A | | 6/1993 | Maubray | |
| 5,392,489 A | * | 2/1995 | Mohnach ........ | 15/250.201 |
| 6,158,079 A | * | 12/2000 | Shibata .......... | 15/250.351 |
| 6,739,018 B1 | * | 5/2004 | Jallet et al. ..... | 15/250.201 |
| 2003/0167587 A1 | * | 9/2003 | Egner-Walter ... | 15/250.43 |
| 2004/0098821 A1 | * | 5/2004 | Kraemer et al. . | 15/250.201 |

FOREIGN PATENT DOCUMENTS

| | | |
|---|---|---|
| DE | 31 42 716 | 5/1983 |
| DE | 100 38 404 | 3/2002 |
| DE | 10111757 | * 9/2002 |
| EP | 0205725 A2 | 12/1986 |
| FR | 1370826 | 8/1964 |
| FR | 2 785 248 | 5/2000 |
| WO | WO 92/22444 | 12/1992 |

OTHER PUBLICATIONS

Abstract for German publication 10111757 to Hollaender, published Sep. 2002.*

* cited by examiner

*Primary Examiner*—Gary K Graham
(74) *Attorney, Agent, or Firm*—Michael Best & Friedrich LLP

(57) ABSTRACT

The invention starts with a wiper device, in particular for a motor vehicle, which includes a wiper arm (10*a*-10*j*), which features a wiper rod (12*a*-12*j*) and a fastening part (14*a*-14*j*) connected in a non-articulated manner with the wiper rod (12*a*-12*j*).

It is proposed that the wiper device have at least one spoiler element (16*a*-16*j*) to generate a flow-induced bearing force.

25 Claims, 5 Drawing Sheets

WIPER DEVICE

BACKGROUND OF THE INVENTION

The invention starts with a wiper device.

A generic wiper device is known from DE 31 42 716 C2. The wiper device includes a wiper arm with a wiper rod manufactured of an elastic plastic, which is connected on one end in a non-articulated manner with a fastening part and on whose free end a wiper blade can be fastened.

SUMMARY OF THE INVENTION

The invention starts with a wiper device, in particular for a motor vehicle, which includes a wiper arm, which features a wiper rod and a fastening part connected in a non-articulated manner with the wiper rod.

It is proposed that the wiper device include at least one spoiler element to generate a flow-induced bearing force. An especially flat wiper device that is particularly suited for high speeds can be achieved advantageously. In addition, the spoiler element can be used advantageously to support functioning, for example, to dampen vibrations, increase torsional rigidity, etc.

In this context, a non-articulated connection should be understood as the wiper rod and the fastening part being connected without a materially-designed swivel axis around which the wiper rod and the fastening part could be swiveled relative to one another. Components, which make a relative movement possible between the wiper rod or sections of the wiper rod and the fastening part, in particular due to an elastic material deformation should not be viewed as articulation in this context and should also be included particularly in the protective area, such as film hinges, elastic sections, elastic wiper rods, etc. In this case, the wiper rod and the fastening part can be designed to be a single piece or several pieces.

If the spoiler element is designed at least partially as a single piece with the wiper arm, additional components, assembly expense, structural space and costs can be saved.

On the other hand, if the spoiler element is formed by at least one component separate from a wiper rod component of the wiper rod, the spoiler element and wiper rod component can be designed separate from one another for their respective functions. In particular, the spoiler element can be formed by a particularly cost-effective material as compared to the wiper rod component.

In addition, it is proposed that at least one wiper rod component of the wiper rod be arranged at least partially in a receptacle area of the spoiler element. A simple assembly can be achieved; edges of the wiper rod component can be advantageously covered by means of the spoiler element and at least a kind of pedestrian impact protection can be achieved by means of the spoiler element in particular.

If the spoiler element is fastened via at least one locking connection, assembly can be further simplified, a connection that is particularly reliable for the process can be achieved and in particular tool-free assembly and disassembly can be achieved. Moreover, locking elements of the locking connection can be formed as simply as a single piece, and additional components and costs can be saved. In addition to a locking connection, however, all other frictional, positively engaged and/or integral connections that appear to be meaningful to the expert are also conceivable, e.g., adhesive connections, welded connections, screwed connections, clamped connections via plastic deformations and/or via separate clamping means, etc.

In addition, the wiper device can be embodied as a multi-component injection molded part, in which the wiper rod and the spoiler element are formed at least partially of different components. An additional assembly of the components can be dispensed with, and nevertheless the wiper rod and the spoiler element can be advantageously designed in terms of their material for their respective functions.

If the spoiler element is designed to be flexible in at least one area, the spoiler element can be designed in a structurally simple manner extending over the entire area of the wiper rod or the entire area of the wiper arm, in that the spoiler element is able to follow stroke compensation movements because of the flexible design. In this case, the spoiler element can be used to dampen vibrations and to form the design, wherein the spoiler element is formed by a colored material, particularly a colored plastic, or painted together with the wiper arm.

If the spoiler element is designed to be at least largely deflection resistant in at least one area, the spoiler element can be used as a supporting element in particular or be designed as a single piece with one part of the wiper arm or the wiper rod. In addition, the spoiler element can be used in a targeted manner to influence the torsional deflection resistance of the entire wiper arm. A torsional area of the wiper arm can at least be largely limited in an advantageous manner to a main stroke compensation area on an inner end of the wiper rod in operation. In addition, vibrations can be avoided in individual areas in a targeted manner, for example, by a skilled selection of the profile and/or mass of the spoiler element. In doing so, the deflection resistance can be achieved by a special shaping and/or by a special material selection.

Furthermore, it is proposed that the spoiler element be recessed in at least one bending area of at least one wiper rod component in order to make a stroke movement possible, wherein the use of a rigid spoiler profile can guarantee the stroke compensation ability of wiper arm in a simple manner, particularly during operation.

If the spoiler element is recessed on the underside of the wiper rod component of the wiper rod in the bending area and is designed to be at least partially overlapping on the upper side of the bending area, a spoiler element extending at least largely over the entire wiper arm can be achieved and, connected with this, a largely uniform bearing force can be achieved advantageously in the longitudinal extension during operation and a recess of the spoiler element that is concealed during operation can be achieved.

In another embodiment of the invention, it is proposed that the spoiler element feature a changing cross-sectional shape in the longitudinal direction, whereby a deflection resistance that is particularly advantageous in the longitudinal direction and a bearing force that is achievable via the air stream can be adjusted in a targeted manner. Deflection resistant and flexible areas can be achieved and sections that tend to vibrate can be influenced in a targeted manner. In doing so, the spoiler element can be formed by a component that is separate from a wiper arm or can be designed at least partially as a single piece with the wiper arm. In addition to or as an alternative to different cross-sectional shapes in the longitudinal direction, the spoiler element can be manufactured of different materials in the longitudinal area.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The expert will also observe individual features expediently and combine them into additional, meaningful combinations.

The drawings show.

DETAILED DESCRIPTION

Figure 1:
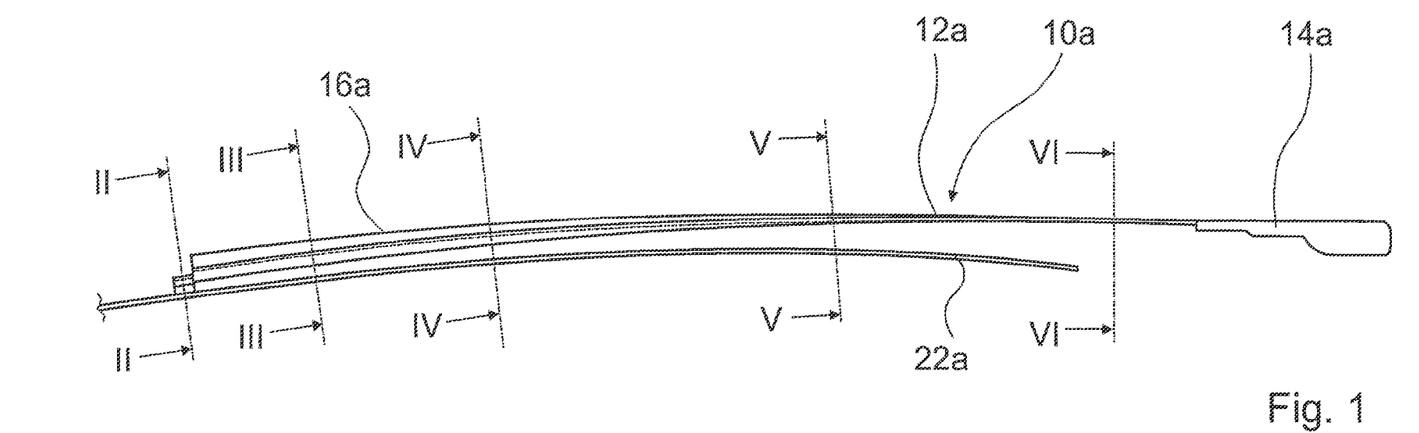
FIG. 1 A side view of a wiper device in accordance with the invention with a wiper arm and spoiler element designed as a single piece with said wiper arm.

FIG. 1 shows a wiper device in accordance with the invention for a motor vehicle with a wiper arm 10a. The wiper arm 10a includes a wiper rod 12a made of spring steel and a fastening part 14a made of an essentially deflection resistant steel that is connected in a non-articulated manner with the wiper rod 12a. Instead of spring steel, the wiper rod could also be formed by other materials that appear to be meaningful to the expert, such as a glass fiber reinforced plastic, for example. The wiper rod 12a is fastened by means of a so-called lapping over of the fastening part 14a via a clamped connection in the fastening part 14a. A bracketless wiper blade 22a is fastened to an arched wiper strip support on an end of the wiper rod 12a facing away from the fastening part 14a.

Figure 2:
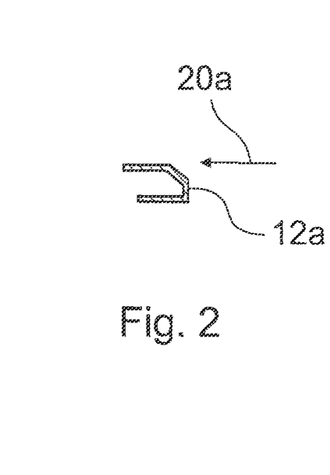
FIG. 2 A section along Line II-II in FIG. 1.
Figure 3:
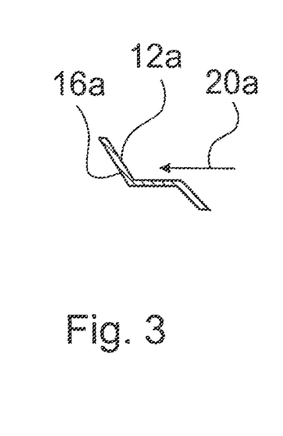
FIG. 3 A section along Line III-III in FIG. 1.
Figure 4:
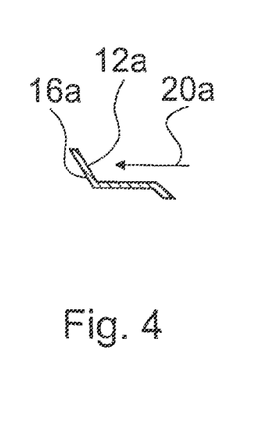
FIG. 4 A section along Line IV-IV in FIG. 1.
Figure 5:
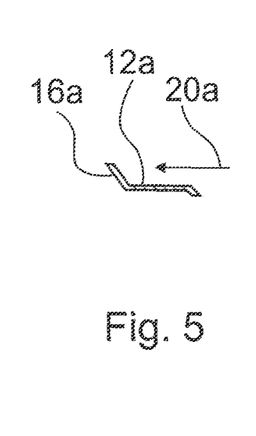
FIG. 5 A section along Line V-V in FIG. 1.

In accordance with the invention, the wiper device includes a spoiler element 16a to generate a flow-induced bearing force. The spoiler element 16a is designed to be a single piece with the wiper arm 10a, and namely a single piece with the wiper rod 12a. On the end facing away from the fastening part 14a, the wiper rod 12a features a closed U-profile against flow direction 20a in the area of a fastening point of the wiper blade 22a at the wiper rod 12a (FIGS. 1 and 2). In the longitudinal direction adjacent to the fastening point, the wiper rod 12a essentially features a S-profile with (as viewed in the flow direction 20a) a forward wing element pointing diagonally downward against flow direction 20a and a rear wing element of the spoiler element 16a pointing diagonally upwards in flow direction 20a.

Figure 6:
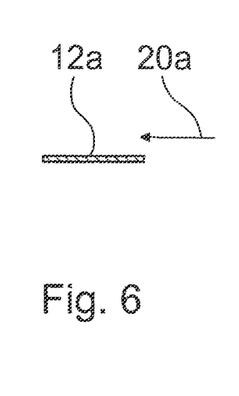
FIG. 6 A section along Line VI-VI in FIG. 1.

The spoiler element 16a features a changing cross-sectional shape in the longitudinal direction, i.e., starting from the end facing away from the fastening part 14a, the wing elements have a length diminishing to zero in the longitudinal direction towards the fastening part 14a (FIGS. 3 to 6). In a main bending area of the wiper rod 12a in front of the fastening part 14a of approx. 10 cm, the wiper rod 12a has an even profile running essentially parallel to the flow essentially parallel to the flow direction 20a (FIGS. 1 and 6). Because of the S-profile, the wiper rod 12a and the spoiler element 16a are essentially designed to be deflection resistance, wherein the deflection resistance also diminishes with diminishing wing length. Instead of a changing cross-sectional shape, the wiper rod could also be designed with a constant cross-sectional shape or with a constant profile, whereby the profile could simply be rolled including pre-bending.

Figure 7:
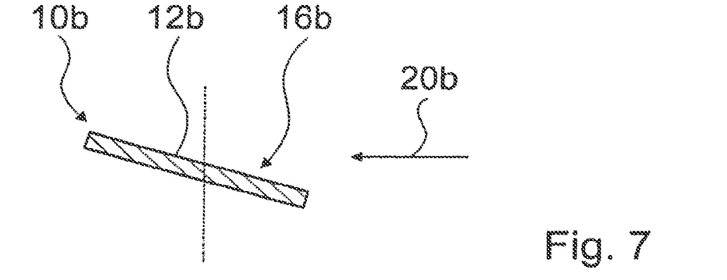
FIG. 7-9 Sectional depictions through wiper devices that are alternatives to FIG. 1.
Figure 8:
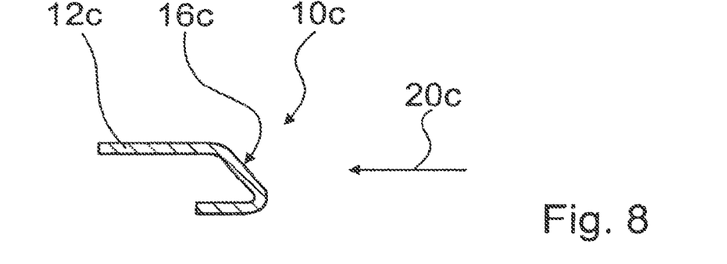
Figure 9:
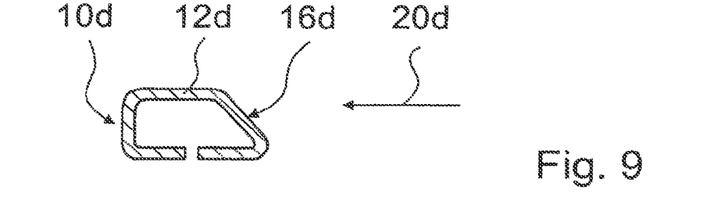

FIGS. 7 through 9 depict cross-sections through alternative wiper devices each with a respective wiper arm 10b, 10c, 10d. In the case of the exemplary embodiments, essentially the same components and same features are numbered with the same reference numbers in the description, but letters have been added to differentiate the exemplary embodiments. Furthermore, reference can be made to the description of the exemplary embodiment in FIGS. 1 through 6 with respect to the unchanging features and functions. The following description is restricted essentially to the differences from the exemplary embodiment in FIGS. 1 through 6.

The wiper arm 10b features a wiper rod 12b that is designed to be a single piece with a spoiler element 16b. The wiper rod 12b features an even profile ascending in the flow direction 20b that is inclined by approx. 40° to the flow direction 20b at its end facing away from a fastening part and it forms the spoiler element 16b via the diagonal inclination. The inclination diminishes from the end facing away from the fastening part in the longitudinal direction toward the fastening part from 40° to 0°. Instead of an inclination of 40°, other inclinations that appear meaningful to the expert are also conceivable, for example from 0 to 90°. Furthermore, is would be fundamentally conceivable to design a fastening part with an inclination corresponding to wiper rod 12b, for example with an inclination of 40°, and to compensate for the inclination with a diagonal bore hole forming a fastening point of the fastening part with a drive shaft.

The wiper arm 10c in FIG. 8 includes a wiper rod 12c embodied as a single piece with a spoiler element 16c, which wiper rod has a closed U-profile against the flow direction 20c, whereby a base part of the U-profile pointing against the flow direction 20c is embodied to be ascending diagonally in the flow direction 20c. A reinforcement of the wiper rod 12c is achieved due to the U-profile.

The wiper arm 10d in FIG. 9 includes a wiper rod 12d embodied as a single piece with a spoiler element 16d. The wiper rod 12d has essentially a box profile, whereby a side wall of the box profile pointing against the flow direction 20d is embodied to be ascending diagonally in the flow direction 20d.

FIGS. 10 through 13 depict an alternative wiper device with a wiper arm 10e. The wiper arm 10e includes a fastening part 14e and a wiper rod 12e, which is formed by a deflection resistant, spoiler element 16e extruded from plastic and a wiper rod component 24e formed by a leaf spring made of spring steel. Instead of plastic, the spoiler element 16e could also be manufactured of a metal.

The wiper rod component 24e is held at one end by means of a so-called lapping around of the fastening part 14e via a clamped connection in the fastening part 14e. With a second end, the wiper rod component 24e is inserted into a receptacle area of the spoiler element 16e, which essentially has C-profile open towards an underside with a wing element formed on a cover side.

The wiper rod component 24e is fixed via a locking connection 18e in the receptacle area of the spoiler element 16e.

Figure 11:
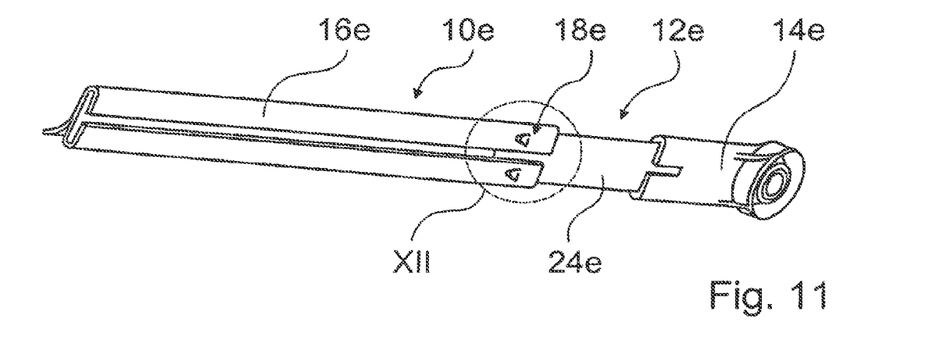
FIG. 11 The wiper device from FIG. 10 as seen diagonally from below.
Figure 12:
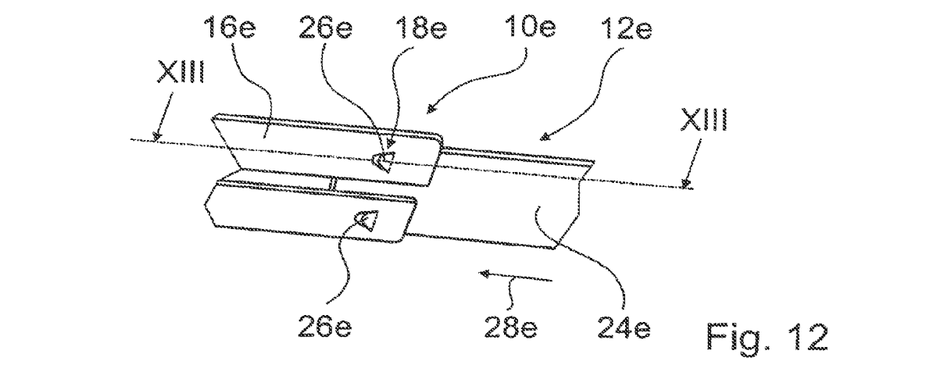
FIG. 12 An enlarged section from XII from FIG. 11.
Figure 13:
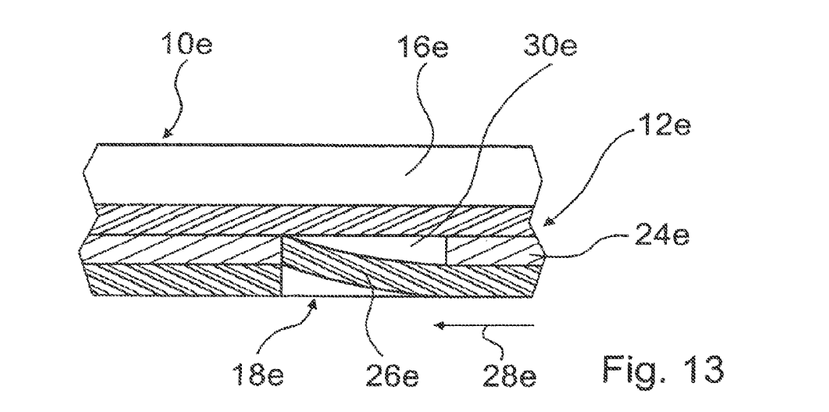
FIG. 13 A section along Line XIII-XIII in FIG. 12.

Two locking meanings 26e, 26e' are formed on the spoiler element 16e on an end facing the wiper rod component 24e in a lower wall pointing towards the to-be-wiped surface in an assembled state, each of which locking means are formed by a circular, partially free-punched section, which forms an ascending diagonal surface or locking hook projecting over an inner side of the receptacle area in the insertion direction 28e of the wiper rod component 24e (FIGS. 11, 12, and 13).

If the free end of the wiper rod component 24e comes into the area of the locking means 26e, 26e' during insertion, the locking means 26e, 26e' are deflected perpendicular to the insertion direction 28e and perpendicular to the underside of the spoiler element 16e and with a continued insertion movement then lock into locking means 30e on the wiper rod component 24e that are formed by circular passage openings (FIG. 13). Instead of the locking means 26e, 26e' deflecting, it is conceivable for the wiper rod component 24e to deflect during the locking process. Free spaces on a cover side of the spoiler element 16e could be provided for this, into which the wiper rod component 24e can deflect or yield during the locking process. At the same time as the locking, the wiper rod component's 24e front side ends up adjacent to a formed-on limit stop (not shown in greater detail) projecting into the receptacle area of the spoiler element 16e. The wiper rod component 24e is securely fixed in the spoiler element 16e.

The spoiler element 16e forms a front portion of the wiper rod 12e. To make a stroke compensation movement possible during operation, the spoiler element 16e is recessed in a main bending area of the wiper rod component 24e. The wiper arm 10e is depicted in a stressed operating state in FIGS. 10 and 11, whereby a dashed line in FIG. 10 also shows the wiper arm 10e in an unstressed operating state. The wiper rod component 24e is essentially bent straight in operation and thereby brings about a bearing force of a wiper blade on the to-be-wiped surface.

Figure 10:
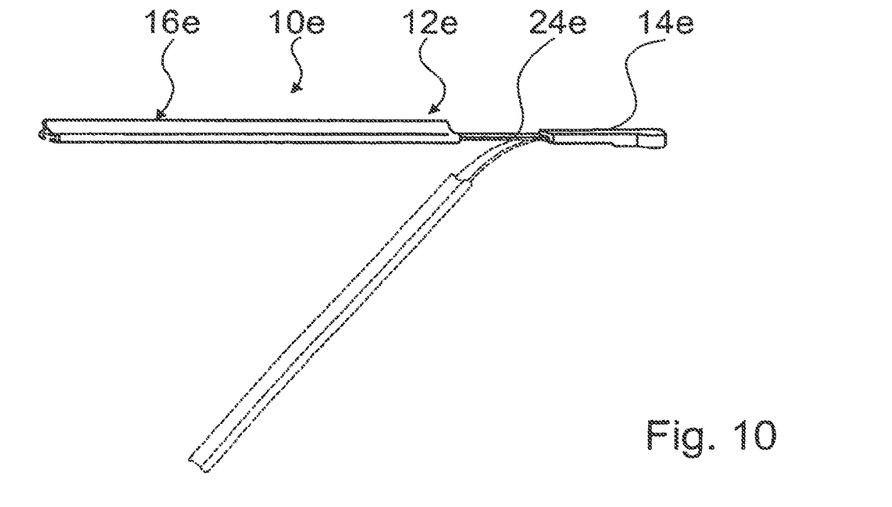
FIG. 10 A side view of an alternative wiper device with a wiper arm and a deflection resistant spoiler element.
Figure 14:
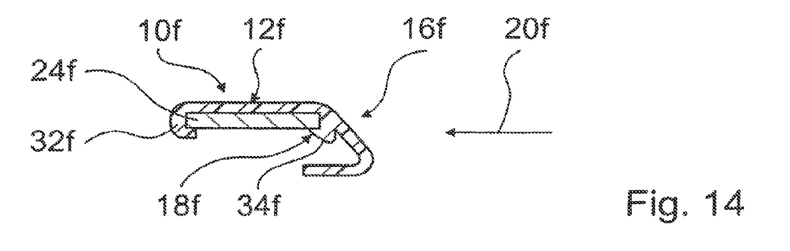
FIG. 14-16 Sectional depictions through wiper devices that are alternatives to FIG. 11.
Figure 15:
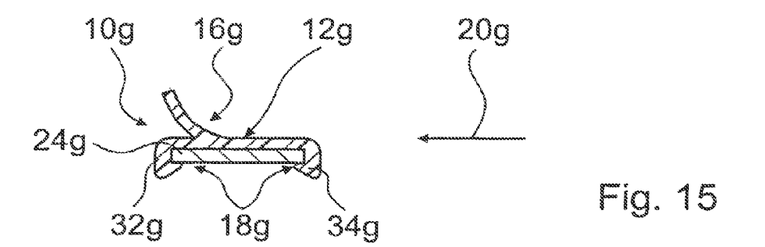
Figure 16:
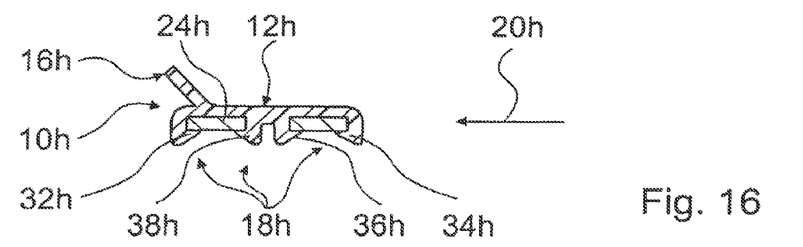

FIGS. 14 through 16 depict cross-sectional representations through wiper devices that are alternatives to FIG. 10. Reference can be made to the description of the exemplary embodiment in FIGS. 10 through 13 with respect to the unchanging features and functions. The following description is restricted essentially to the differences from the exemplary embodiment in FIGS. 10 through 13.

The wiper device in FIG. 14 features a wiper arm 10f, which includes a fastening part and a wiper rod 12f, which is formed by a deflection resistant spoiler element 16f and a wiper rod component 24f formed by a leaf spring.

The spoiler element 16f has a C-profile that is essentially open to an underside, on whose side pointing against a flow direction 20f a wing element with a V-profile is formed as a single piece. During assembly, the spoiler element's 16f first leg 32f, which is semi-circular in cross-section and facing away from the wing element, is snapped into place on an edge of the wiper rod component 24f. Then the spoiler element's 16f second leg 34f, which is embodied as a locking hook, is swiveled around a longitudinal axis of the spoiler element 16f in the direction of the wiper rod component 24f and locked into place on said component.

The wiper device in FIG. 15 has a wiper arm 10g, which includes a fastening part and a wiper rod 12g, which is formed by a deflection resistance spoiler element 16g and a wiper rod component 24g formed by a leaf spring.

The spoiler element 16g has a C-profile that is essentially open to an underside, on whose cover side a curved wing element is formed as a single piece. During assembly, the spoiler element 16g is placed on a cover side of the wiper rod component 24g and then locked into place on the wiper rod component 24g with a pressure movement perpendicular to the cover side of the wiper rod component 24g with its legs 32g, 34g that are embodied as locking hooks.

The wiper device in FIG. 16 has a wiper arm 10h, which includes a fastening part and a wiper rod 12h, which is formed by a deflection resistant spoiler element 16h and a wiper rod component 24h formed by a leaf spring.

The spoiler element 16h essentially has a profile composed of two C-profiles that is open to an underside on whose cover side a wing element is formed as a single piece. During assembly, the spoiler element 16h is placed on a cover side of the slotted wiper rod component 24h and then locked into place on the wiper rod component 24h with a pressure movement perpendicular to the cover side of the wiper rod component 24h with its legs 32h, 34h, 36h, 38h that are embodied as locking hooks, wherein the legs 36h, 38h engage in a slot of the wiper rod component 24h.

Figure 17:
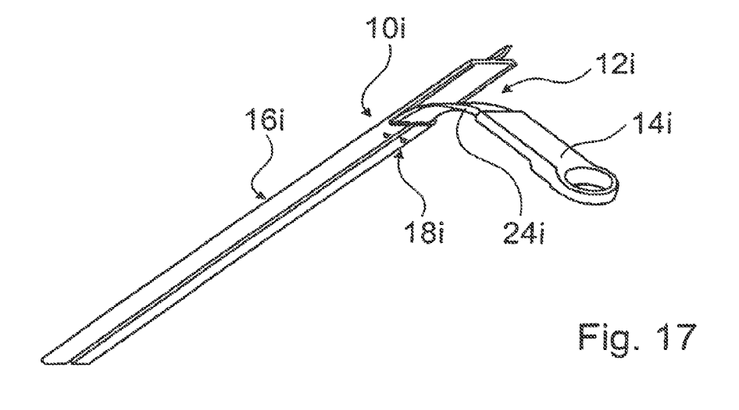
FIG. 17 A wiper device that is an alternative to FIG. 10 with a bending area cover in a unstressed state as seen diagonally from below.
Figure 18:
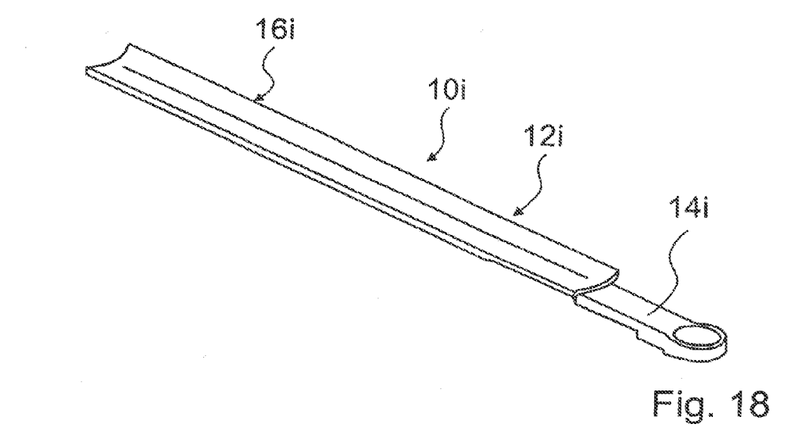
FIG. 18 The wiper device from FIG. 17 as seen diagonally from above in a stressed state.

FIGS. 17 and 18 depict a wiper device that essentially corresponds to the wiper device from FIGS. 10 through 13. In contrast to the wiper device in FIGS. 10 through 13, the wiper device in FIGS. 17 and 18 features a spoiler element 16i, which is recessed in an underside of a wiper rod component 24i of a wiper rod 12i in a main bending area and is designed to be overlapping on an upper side of the main bending area or the wiper rod component 24i. FIG. 17 shows the wiper device with its wiper arm 10i in an unstressed state and FIG. 18 shows it in a stressed state. In a stressed state, the spoiler element 16i extends over the entire length of the wiper rod 12i.

Figure 19:
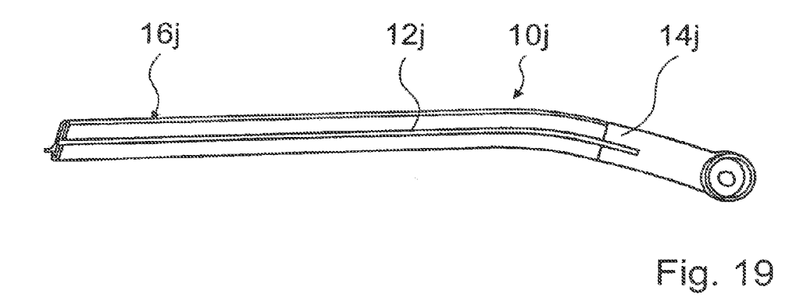
FIG. 19 A side view of a wiper device that is an alternative to FIG. 10 with a flexible spoiler element in a stressed state.
Figure 20:
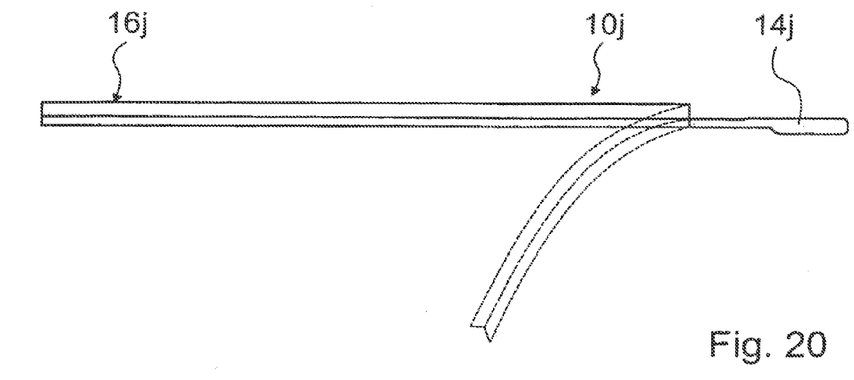
FIG. 20 The wiper device from FIG. 19 in a unstressed state as seen diagonally from below.

FIGS. 19 and 20 depict an alternative wiper device with a wiper arm 10j. The wiper arm 10j includes a fastening part 14j and a wiper rod 12j, which are formed by a leaf spring made of spring steel.

The wiper rod 12j is fastened on one end by means of a so-called overlapping of the fastening part 14j via a clamped connection in the fastening part 14j.

A flexible spoiler element 16j made of rubber is inserted with its receptacle area onto the wiper rod 12j and adhered with the wiper rod 12j. Instead of inserting the spoiler element 16j onto the wiper rod 12j, the spoiler element could also be injection molded around the wiper rod 12j. The spoiler element 16j extends over the entire length of the wipe rod 12j and essentially has a C-profile that is open to the underside, on whose cover side a wing element is formed as a single piece (FIG. 20).

In FIG. 20 the wiper arm 10j is depicted in a stressed state and in an unstressed state as a dashed line. Furthermore, the wiper arm 10j is depicted in FIG. 20 in an unstressed state as viewed diagonally from below. In this case, the spoiler element 16j follows the deformations of the wiper rod 12j.

The invention claimed is:

1. Wiper device comprising:
   a wiper arm (10a-10j) with at least one elastic section, which features a wiper rod (12a-12j) and a fastening part (14a-14j) connected especially in a non-articulated manner with said wiper rod (12a-12j);
   and at least one spoiler element (16a-16j) to generate a flow-induced bearing force;
   wherein said at least one spoiler element (16a-16j) substantially abuts over its entire length on said wiper rod (12a-12j) in at least a stressed state of said wiper rod (12a-12j) when said spoiler element (16a-16j) is mounted on said wiper rod (12a-12j), wherein said fastening part (14a-14j) is provided to accommodate a drive shaft, and wherein said fastening part (14a-14j) is connected with said wiper rod (12a-12j) via said at least one elastic section of said wiper arm (10a-10j);

wherein the spoiler element (16a-16d, 16i) features a changing cross-sectional shape in the longitudinal direction;

wherein said spoiler element (16a) is designed to be a single piece with said wiper rod (12a), and wherein on one end of said wiper rod (12a) facing away from said fastening part (14a) said wiper rod (12a) has a U-shaped cross-section which changes into a S-shaped cross-section along said longitudinal direction.

2. Wiper device according to claim 1, characterized in that the spoiler element (16a-16i) is designed at least partially as a single piece with the wiper arm (10a-10i).

3. Wiper device according to claim 1, wherein said S-shaped cross-section has a forward wing element pointing diagonally downward against a flow direction (20a) and has a rear wing element pointing diagonally upwards in said flow direction (20a).

4. Wiper device according to claim 3, wherein said wing elements have a length diminishing to zero in said longitudinal direction when starting from said end of the wiper rod (12a) facing away from said fastening part (14a).

5. Wiper device according to claim 1, wherein said wiper rod (12a-12j) is held by means of an overlapping of said fastening part (14a-14j) via a clamped connection in said fastening part (14a-14j).

6. Wiper device comprising:
a wiper arm (10a-10j) with at least one elastic section, which features a wiper rod (12a-12j) and a fastening part (14a-14j) connected especially in a non-articulated manner with said wiper rod (12a-12j);
and at least one spoiler element (16a-16j) to generate a flow-induced bearing force;
wherein said at least one spoiler element (16a-16j) extends along substantially an entire length on said wiper rod (12a-12j) in at least a stressed state of said wiper rod (12a-12j) when said spoiler element (16a-16j) is mounted on said wiper rod (12a-12j), wherein said fastening part (14a-14j) is provided to accommodate a drive shaft, and wherein said fastening part (14a-14j) is connected with said wiper rod (12a-12j) via said at least one elastic section of said wiper arm (10a-10j);
wherein said spoiler element (16b) is designed to be a single piece with said wiper rod (12b),
wherein said wiper rod (12b) has an substantially linear profile ascending in a flow direction (20b) that is inclined by approximately 40° to said flow direction (20b) at its end facing away from said fastening part (14b), and
wherein said even profile forms said spoiler element (16b) via a diagonal inclination, and wherein said diagonal inclination diminishes from said end facing away from said fastening part (14b) in said longitudinal direction toward said fastening part (14b) from 40° to 0°.

7. Wiper device according to claim 6, characterized in that the spoiler element (16a-16i) is designed at least partially as a single piece with the wiper arm (10a-10i).

8. Wiper device according to claim 6, characterized in that the spoiler element (16a-16d, 16i) features a changing cross-sectional shape in the longitudinal direction.

9. Wiper device according to claim 6, wherein said wiper rod (12a-12j) is held by means of an overlapping of said fastening part (14a-14j) via a clamped connection in said fastening part (14a-14j).

10. Wiper device comprising:
a wiper arm (10a-10j) with at least one elastic section, which features a wiper rod (12a-12j) and a fastening part (14a-14j) connected especially in a non-articulated manner with said wiper rod (12a-12j);
and at least one spoiler element (16a-16j) to generate a flow-induced bearing force;
wherein said at least one spoiler element (16a-16j) substantially abuts over its entire length on said wiper rod (12a-12j) in at least a stressed state of said wiper rod (12a-12j) when said spoiler element (16a-16j) is mounted on said wiper rod (12a-12j), wherein said fastening part (14a-14j) is provided to accommodate a drive shaft, wherein said fastening part (14a-14j) is connected with said wiper rod (12a-12j) via said at least one elastic section of said wiper arm (10a-10j),
wherein said spoiler element (16c) is designed to be a single piece with said wiper rod (12c), and wherein said wiper rod (12c) has a U-profile with a base part that ascends diagonally in a flow direction (20c) to form said spoiler element (16c).

11. Wiper device according to claim 10, characterized in that the spoiler element (16a-16i) is designed at least partially as a single piece with the wiper arm (10a-10i).

12. Wiper device according to claim 10, characterized in that the spoiler element (16a-16d, 16i) features a changing cross-sectional shape in the longitudinal direction.

13. Wiper device according to claim 10, wherein said wiper rod (12a-12j) is held by means of an overlapping of said fastening part (14a-14j) via a clamped connection in said fastening part (14a-14j).

14. Wiper device comprising:
a wiper arm with at least one elastic section, which features a wiper rod and a fastening part connected especially in a non-articulated manner with said wiper rod; and
at least one spoiler element to generate a flow-induced bearing force;
wherein said fastening part is provided to accommodate a drive shaft, wherein said fastening part is connected with said wiper rod via said at least one elastic section of said wiper arm, wherein said spoiler element is designed to be slipped over said wiper rod, wherein said spoiler element is secured to the wiper rod via a locking connection, wherein said locking connection consists of hook-like elements which engage into corresponding recesses when said spoiler element is mounted on said wiper rod.

15. Wiper device according to claim 14, characterized in that the spoiler element (16e-16j) is formed by at least one component separate from a wiper rod component (24e-24i) of the wiper rod (12e-12j).

16. Wiper device according to claim 15, characterized in that at least one wiper rod component (24e-24i) of the wiper rod (12e-12j) is arranged at least partially in a receptacle area of the spoiler element (16e-16j).

17. Wiper device according to claim 16, characterized in that the spoiler element (16e-16i) is fastened via at least one locking connection (18e-18i).

18. Wiper device according to claim 15, characterized in that the spoiler element (16e-16i) is fastened via at least one locking connection (18e-18i).

19. Wiper device according to claim 15, characterized in that the spoiler element (16e-16i) is recessed in at least one bending area of at least one wiper rod component (24e-24i) of the wiper rod (12e-12i) in order to make a stroke movement possible.

20. Wiper device according to claim 19, characterized in that the spoiler element (16i) is recessed on an underside of the wiper rod component (24i) of the wiper rod (12i) in the bending area and is designed to be at least partially overlapping on an upper side of the bending area.

21. Wiper device according to claim 14, characterized in that the spoiler element (16*j*) is designed to be flexible in at least one area.

22. Wiper device according to claim 14, characterized in that the spoiler element (16*a*-16*i*) is designed to be at least largely deflection resistant in at least one area.

23. Wiper device according to claim 22, characterized in that the spoiler element (16*e*-16*i*) is recessed in at least one bending area of at least one wiper rod component (24*e*-24*i*) of the wiper rod (12*e*-12*i*) in order to make a stroke movement possible.

24. Wiper device according to claim 23 characterized in that the spoiler element (16*i*) is recessed on an underside of the wiper rod component (24*i*) of the wiper rod (12*i*) in the bending area and is designed to be at least partially overlapping on an upper side of the bending area.

25. Wiper device according to claim 14, wherein said spoiler element (16*e*-16*j*) has a receptacle area to accommodate said wiper rod (12*e*-12*j*).

* * * * *